(12) United States Patent
Uno

(10) Patent No.: US 7,559,260 B2
(45) Date of Patent: Jul. 14, 2009

(54) ROTATIONAL ANGLE DETECTING DEVICE

(75) Inventor: Koji Uno, Tokyo (JP)

(73) Assignee: Niles Co., Ltd. (JP)

( * ) Notice: Subject to any disclaimer, the term of this patent is extended or adjusted under 35 U.S.C. 154(b) by 0 days.

(21) Appl. No.: 11/727,464

(22) Filed: Mar. 27, 2007

(65) Prior Publication Data

US 2007/0233423 A1    Oct. 4, 2007

(30) Foreign Application Priority Data

Mar. 29, 2006    (JP)    ............... 2006-092340

(51) Int. Cl.
*G01L 3/02* (2006.01)
(52) U.S. Cl. ............................... 73/862.326
(58) Field of Classification Search ............ 73/862.326
See application file for complete search history.

(56) References Cited

U.S. PATENT DOCUMENTS 6,848,187 B2 *   2/2005   Ito et al. ..................... 33/1 PT
7,073,398 B2 *   7/2006   Kondo et al. ........... 73/862.326
7,200,515 B2 *   4/2007   Sakabe et al. ............... 702/151
7,268,988 B2 *   9/2007   Tsutsui ........................ 361/31

FOREIGN PATENT DOCUMENTS

JP          9-178512          7/1997

* cited by examiner

*Primary Examiner*—Lisa M Caputo
*Assistant Examiner*—Octavia Davis
(74) *Attorney, Agent, or Firm*—Rader Fishman & Grauer PLLC; Ronald P. Kananen

(57) ABSTRACT

Supply and interruption of power source to the first angle sensor 2 and the second angle sensor 4 are alternately performed, by comparing the signal Vo1 or Vo2 which is outputted from the first angle sensor 2 or the second angle sensor 4 and amplified by the first signal amplifier 3 or the second signal amplifier 5 with the signal Vo1 or the signal Vo2 in a state where the abnormality such as the short-circuit does not occur between the wires, so that the determination is made as to whether or not the abnormality such as the short-circuit is present between the wires. The calculating section 6 can quickly detect an abnormality such as the short-circuit simply by supplying the power source to the first angle sensor 2 or the second angle sensor 4. In consequence, the abnormality of the rotational angle detecting device 1 can be detected before the steering wheel connected to the vehicular steering shaft is operated.

7 Claims, 6 Drawing Sheets

ROTATIONAL ANGLE DETECTING DEVICE

CROSS-REFERENCE TO RELATED APPLICATION

This application is based on Japanese Patent Application No. 2006-092340 filed on Mar. 29, 2006, the disclosure of which is incorporated herein by reference.

BACKGROUND OF THE INVENTION

1. Field of the Invention

The present invention relates to a rotational angle detecting device which is capable of detecting abnormality of an angle sensor (whether or not short-circuit between output terminals of the angle sensor occurs) detecting a rotational angle of a rotary element.

2. The Related Art of the Invention

FIG. 5 shows a conventional device for detecting a rotational angle of a rotary element.

This device is arranged in such a manner that a first angle sensor 100 and a second angle sensor 200 are located as opposed to a rotary element (not shown). Output wave profiles outputted in accordance with rotation of the rotary element from the first angle sensor 100 and the second angle sensor 200 are respectively amplified by a first signal amplifier 101 and a second signal amplifier 201 and thereafter, a calculating section 300 detects a rotational angle of the rotary element based upon a signal (Vo1) outputted from the first signal amplifier 101 and a signal (Vo2) outputted from the second signal amplifier 201.

Here, the first angle sensor 100 and the second angle sensor 200 are arranged to deviate from each other by 90 degrees. This arrangement, as shown in FIG. 6, causes the signal Vo1 and the signal Vo2 to be inputted to the calculating section 300 in the form that the wave profile of the signal Vo1 and the wave profile of the signal Vo2 deviate in phase by 90 degrees from each other.

In addition, the calculating section 300 calculates a difference amount between the signal Vo1 and the signal Vo2 outputted from the first signal amplifier 101 and the second signal amplifier 201 to determine whether or not the calculated difference amount is beyond a predetermined value. The calculating section 300 is, based upon the determination result, detects whether or not an abnormality such as a break or a short-circuit occurs in a wire 105 (wire by which the signal Vo1 is transmitted) connecting between the first signal amplifier 101 and the calculating section 300.

For example, JP-9-178512A discloses an arrangement of thus detecting abnormality of a device by comparing signals outputted from two angle sensors.

In the conventional rotational angle detecting device, an abnormality of the wire 105 connecting between the first signal amplifier 101 and the calculating section 300 can be detected. However, in a case where a short-circuit between an output terminal 102 of the first angle sensor 100 and an output terminal 202 of the second angle sensor 200, a short-circuit between the output terminals 102 and 103 of the first angle sensor 100 or further a short-circuit between the output terminals 202 and 203 of the second angle sensor 200 occurs, the short-circuit thereof can not be detected. For example, in a case where the output terminal 102 of the first angle sensor 100 and the output terminal 202 of the second angle sensor 200 are short-circuited, a signal Vo1' and a signal Vo2' outputted from the first signal amplifier 101 and the second signal amplifier 201, as shown in FIG. 6, deviate in amplitude and phase from a signal Vo1 and a signal Vo2 in a normal state of the device.

As shown in FIG. 6, however, a voltage of each of the signals Vo1 and Vo2 in a normal state of the angle sensor and a voltage of each of the signals Vo1' and Vo2' at an abnormal state thereof are all equal in the vicinity of, for example, 45 degrees and 225 degrees in angle of the rotary element. In consequence, in the vicinity of these angles the abnormality such as breaking or short-circuit of the output terminals 102, 103, 202, and 203 can not be detected simply by comparing the signals Vo1' and Vo2'. Further, since it is not until the signals Vo1 and Vo2 change that the normality or the abnormality of the angle sensor can be determined, the normality or the abnormality of the angle sensor can not be determined until the rotary element starts to rotate.

In addition, there exists a characteristic variation in an element used in each of the first angle sensor 100 and the second angle sensor 200. Therefore, when the signals Vo1 and Vo2 are close to the signals Vo1' and Vo2', the rotational angle detecting device errs in detecting an occurrence of an abnormality such as a break or a short-circuit in the wire by comparing the signals Vo1 and Vo2.

In view of the above, there exists a need for a rotational angle detecting device which overcomes the above-mentioned problems in the related art. The present invention addresses this need in the related art as well as other needs, which will become apparent to those skilled in the art from this disclosure.

SUMMARY OF THE INVENTION

Therefore, the present invention is made in view of the foregoing problems and it is an object of the present invention to provide a rotational angle detecting device which is capable of quickly detecting an abnormality of an angle sensor without rotating a rotary element.

According to the present invention, a rotational angle detecting device comprises a detecting section for outputting a signal in accordance with a rotational angle of a rotary element, an angle detecting unit for detecting a rotational angle of the rotary element based upon the signal outputted from the detecting section, an abnormality detecting unit for detecting an abnormality of an output system of the detecting section based upon the signal outputted from the detecting section, and a power supplying unit for supplying power to the detecting section, wherein the power supplying unit performs a supply and interruption of power to the detecting section, and the abnormality detecting unit compares a reference signal outputted from the detecting section when the power supplying unit performs supply and interruption of the power in a case where no abnormality occurs in the output system of the detecting section with a signal outputted from detecting section when the power supplying unit performs the supply and interruption of the power, thereby detecting abnormality of the output system of the detecting section.

According to the present invention, the abnormality detecting unit compares a reference signal outputted from the detecting section when the power supplying unit performs supply and interruption of the power in a case where no abnormality occurs in the output system of the detecting section with a signal outputted from detecting section when the power supplying unit performs a supply and interruption of the power, thereby detecting an abnormality of the output system of the detecting section. Therefore, detection of the abnormality can be quickly made simply by performing the supply and interruption of the power to the detecting section even without rotation of the rotary element.

These and other objects, features, aspects and advantages of the present invention will be become apparent to those skilled in the art from the following detailed description, which, taken in conjunction with the annexed drawings, discloses a preferred embodiment of the present invention.

BRIEF EXPLANATION OF THE DRAWINGS

Referring now to the attached drawings which form a part of this original disclosure.

DETAILED DESCRIPTION OF THE PREFERRED EMBODIMENT

Selected preferred embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

An embodiment of the present invention will be explained with reference to drawings.

Figure 1:
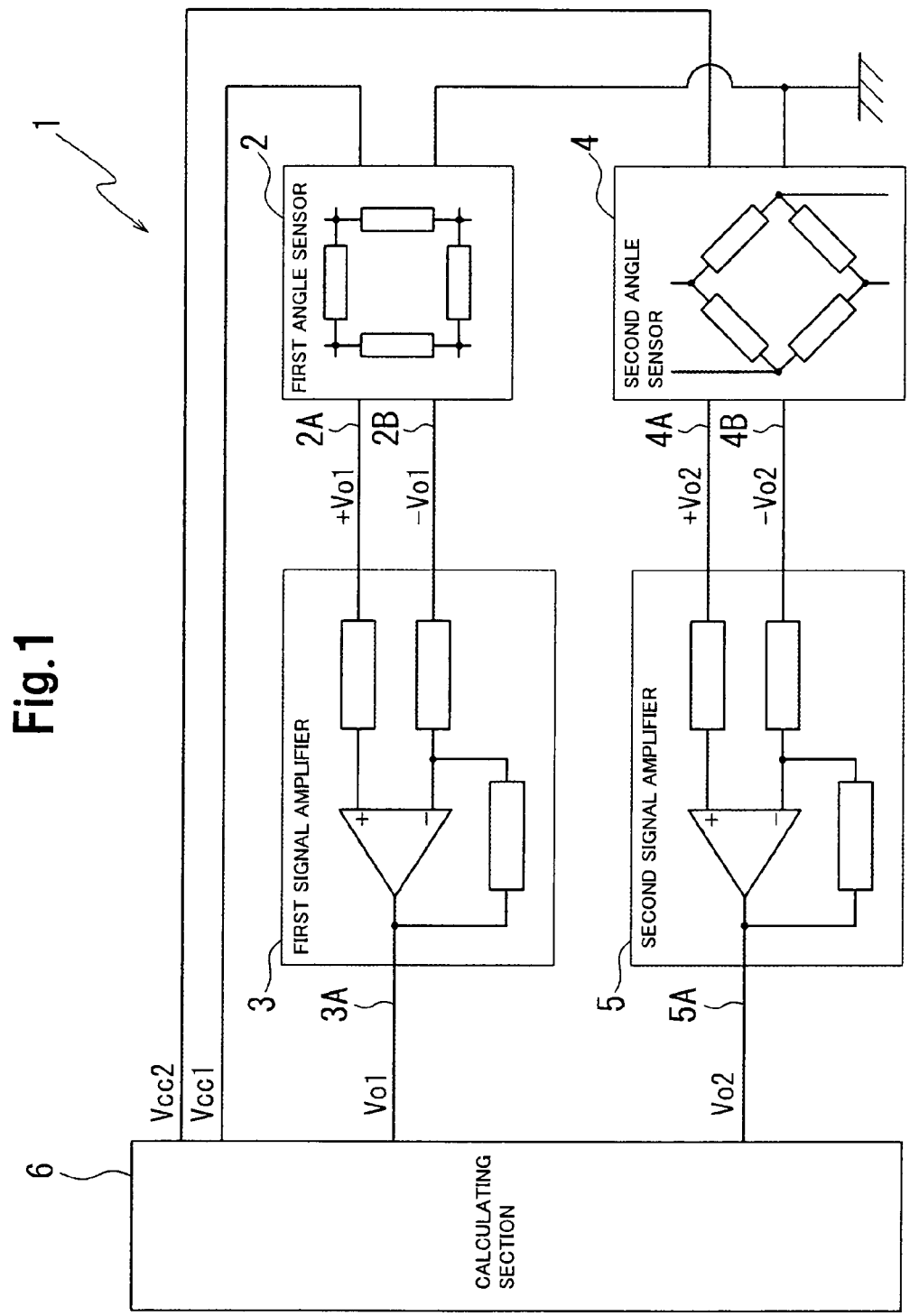
FIG. 1 is a circuit diagram showing an embodiment of the invention.

FIG. 1 shows a circuit diagram of an embodiment. It should be noted that an angle sensor in the embodiment is to detect a rotational angle of a steering shaft for a vehicle. A rotational angle detecting device 1 is composed of a first angle sensor 2, a second angle sensor 4, a first signal amplifier 3, a second signal amplifier 5 and a calculating section 6. The first angle sensor 2 and the second angle sensor 4 are located as opposed to a rotary element (steering shaft, not shown). The first signal amplifier 3 receives a signal +Vo1 or −Vo1 outputted from the first angle sensor 2 for amplification. The second signal amplifier 5 receives a signal +Vo2 or −Vo2 outputted from the second angle sensor 4 for amplification. The calculating section 6 receives the signal Vo1 amplified by the first signal amplifier 3 and the signal Vo2 amplified by the second signal amplifier 5 to detect a rotational angle of the rotary element.

The calculating section 6 can detect an abnormality such as a break or a short-circuit between a wire connecting between the first angle sensor 2 and the first signal amplifier 3 and a wire connecting between the second angle sensor 4 and the second signal amplifier 5. In addition, the calculating section 6 may supply power sources Vcc1 and Vcc2 separately to the first angle sensor 2 and the second angle sensor 4. The first angle sensor 2 and the second angle sensor 4 are arranged to deviate by 90 degrees from each other. In addition, the first angle sensor 2 is connected to the first signal amplifier 3, a wire through which the signal +Vo1 transmits denotes a wire 2A, a wire through which the signal −Vo1 transmits denotes a wire 2B, the second angle sensor 4 is connected to the second signal amplifier 5, a wire through which the signal +Vo2 transmits denotes a wire 4A, and a wire through which the signal −Vo2 transmits denotes a wire 4B. Further, the first signal amplifier 3 is connected to the calculating section 6, a wire through which the signal Vo1 transmits denotes a wire 3A, the second signal amplifier 5 is connected to the calculating section 6, a wire through which the signal Vo2 transmits denotes a wire 5A.

Next, abnormality detecting processing executed by the calculating section 6 will be explained. Here, the calculating section 6 performs supply and interruption of a power source to the first angle sensor 2 and the second angle sensor 4 alternately only for a period from a point a vehicular ignition switch turns on to a point a predetermined time elapses (hereinafter referred to as "abnormality detecting period") to determine whether or not the wire 2A and the wire 4A are short-circuited. After an elapse of the abnormality detecting period, the voltage is constantly supplied to the first angle sensor 2 and the second angle sensor 4 to execute the angle detecting processing at a normal state of the device.

Figure 2:
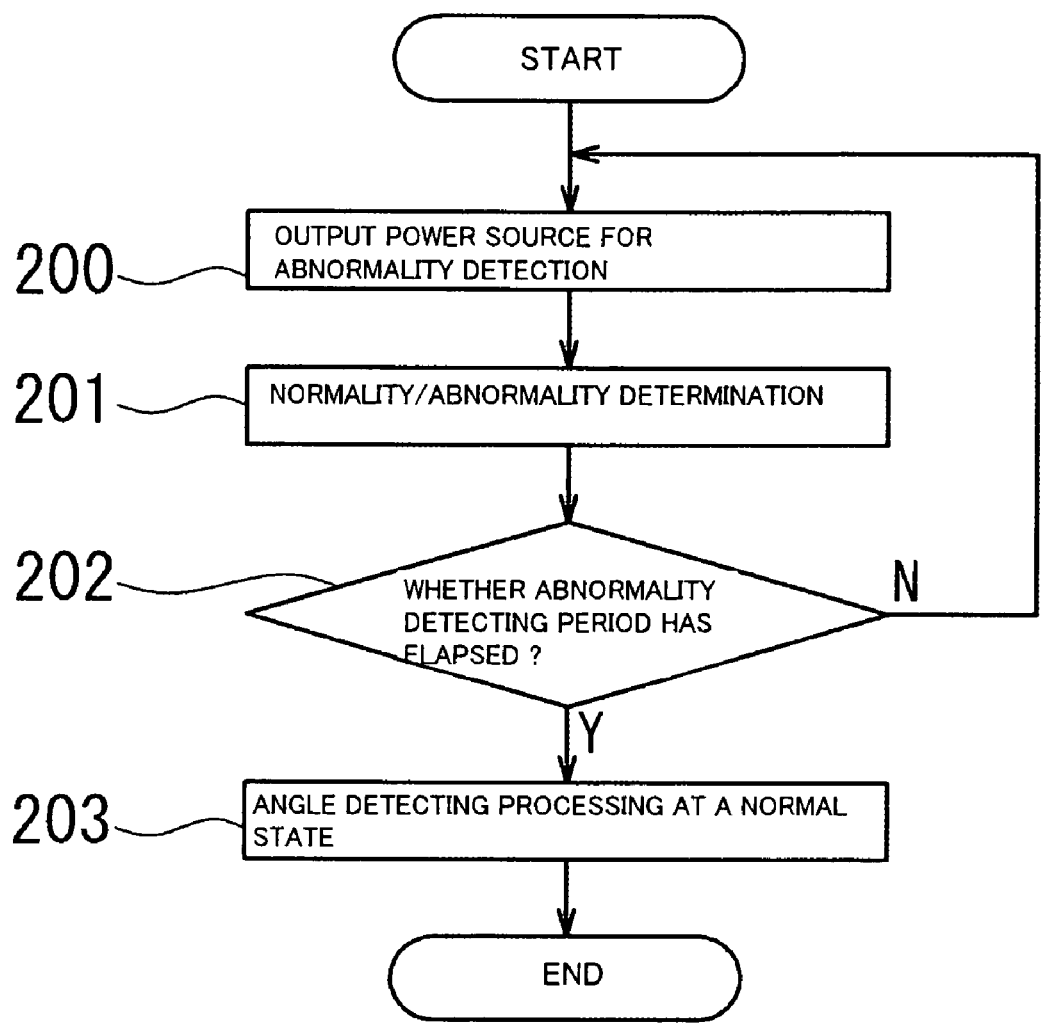
FIG. 2 is a flow chart showing the procedure of an abnormality detecting proceeding.
Figure 3:
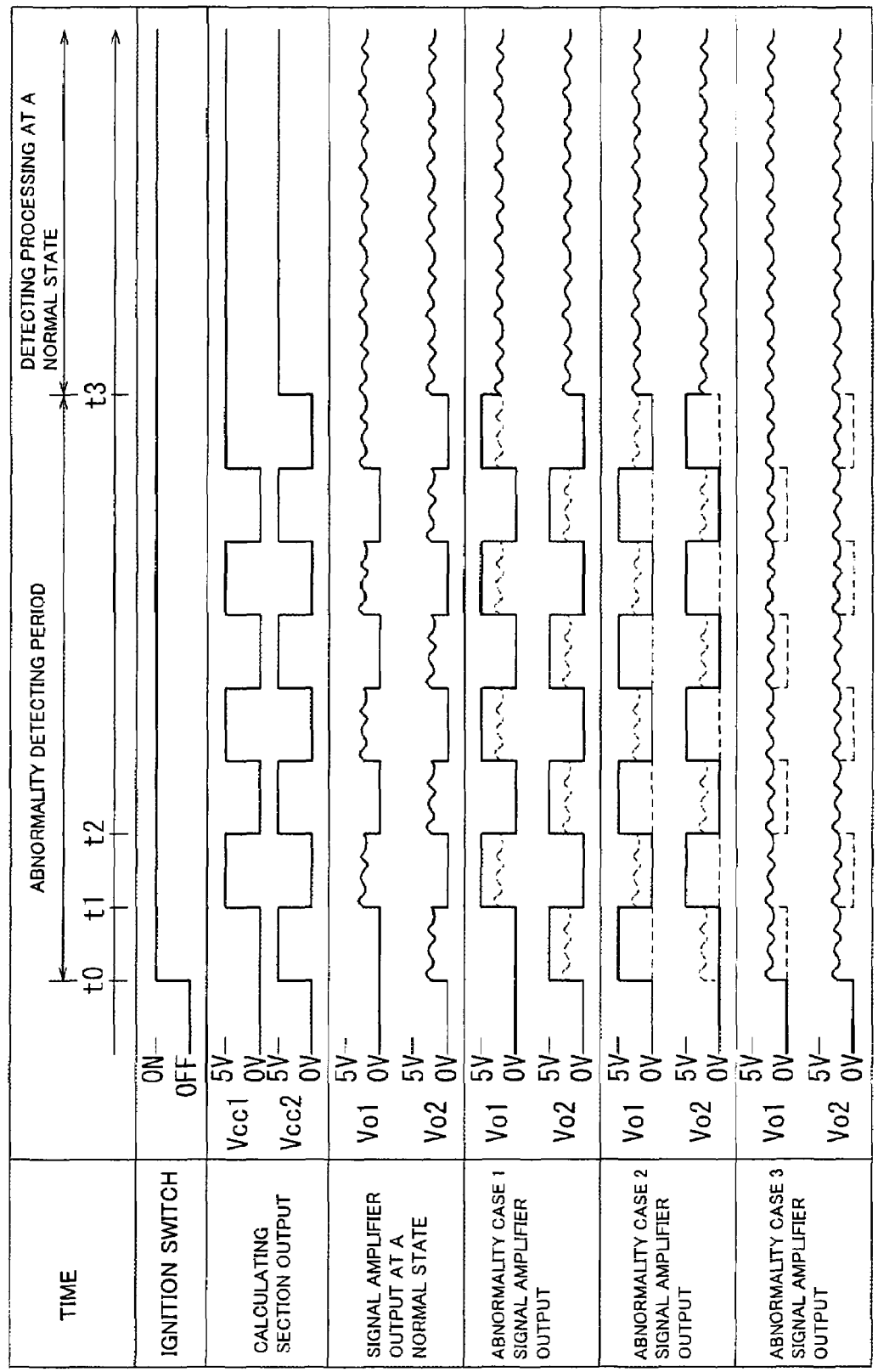
FIG. 3 is a diagram showing a voltage change in each section.

FIG. 2 shows the steps of the abnormality detecting processing executed by the calculating section 6. FIG. 3 shows a voltage wave profile of each section.

First, the explanation is made as to a case where abnormality such as short-circuit does not occur between wires. It should be noted that in a case where an abnormality such as a short-circuit does not occur between wires, the signals Vo1 and Vo2 outputted from the first signal amplifier 3 and the second signal amplifier 5 are shown as signal amplifier outputs at a normal state of the device in FIG. 3. When the vehicular ignition switch turns on, the abnormality detecting processing shown in FIG. 2 starts. As shown in FIG. 3, a time when the ignition switch turns on is set to time to. At step 200, the calculating section 6 supplies the power sources Vcc1 and Vcc2 to the first angle sensor 2 and the second angle sensor 4 alternately. It should be noted that in the embodiment, the voltage of the power sources Vcc1 and Vcc2 is set as 5V, which is supplied first to the second angle sensor 4.

Figure 4:
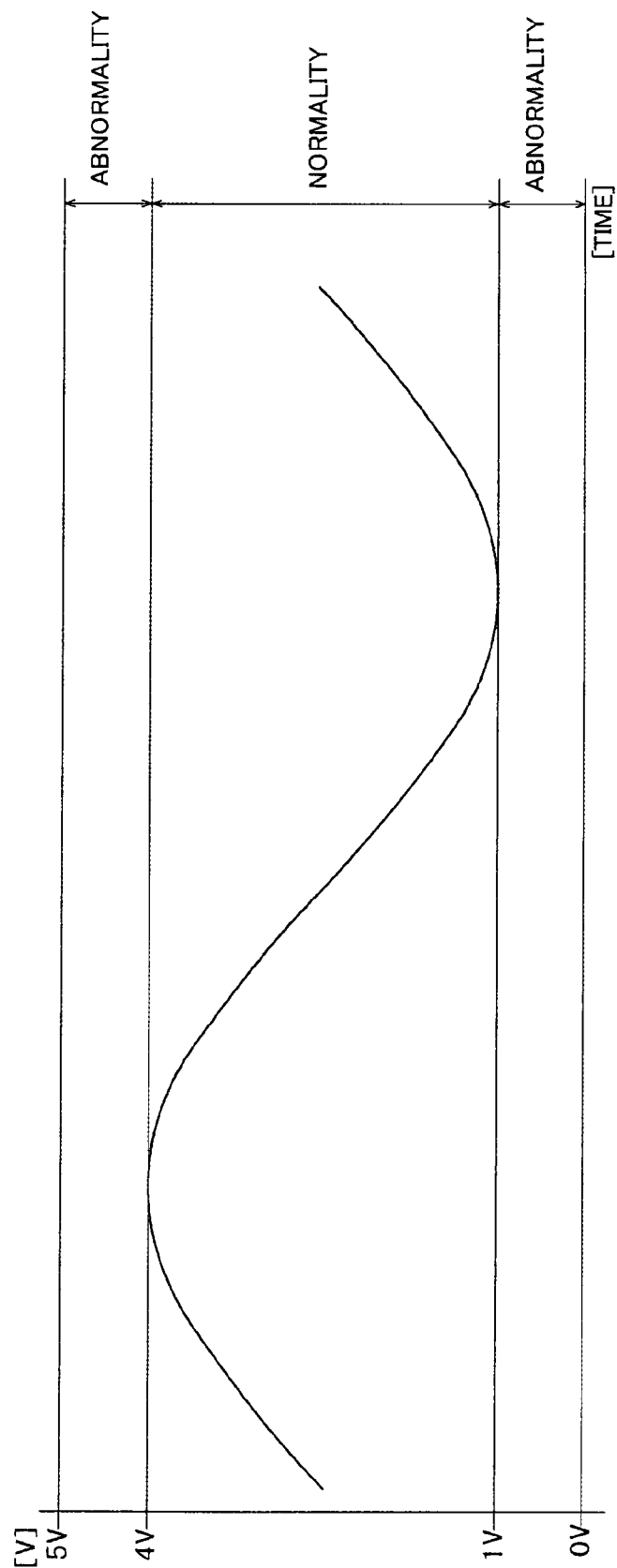
FIG. 4 is a diagram showing a change in signal at a normal state.
Figure 5:
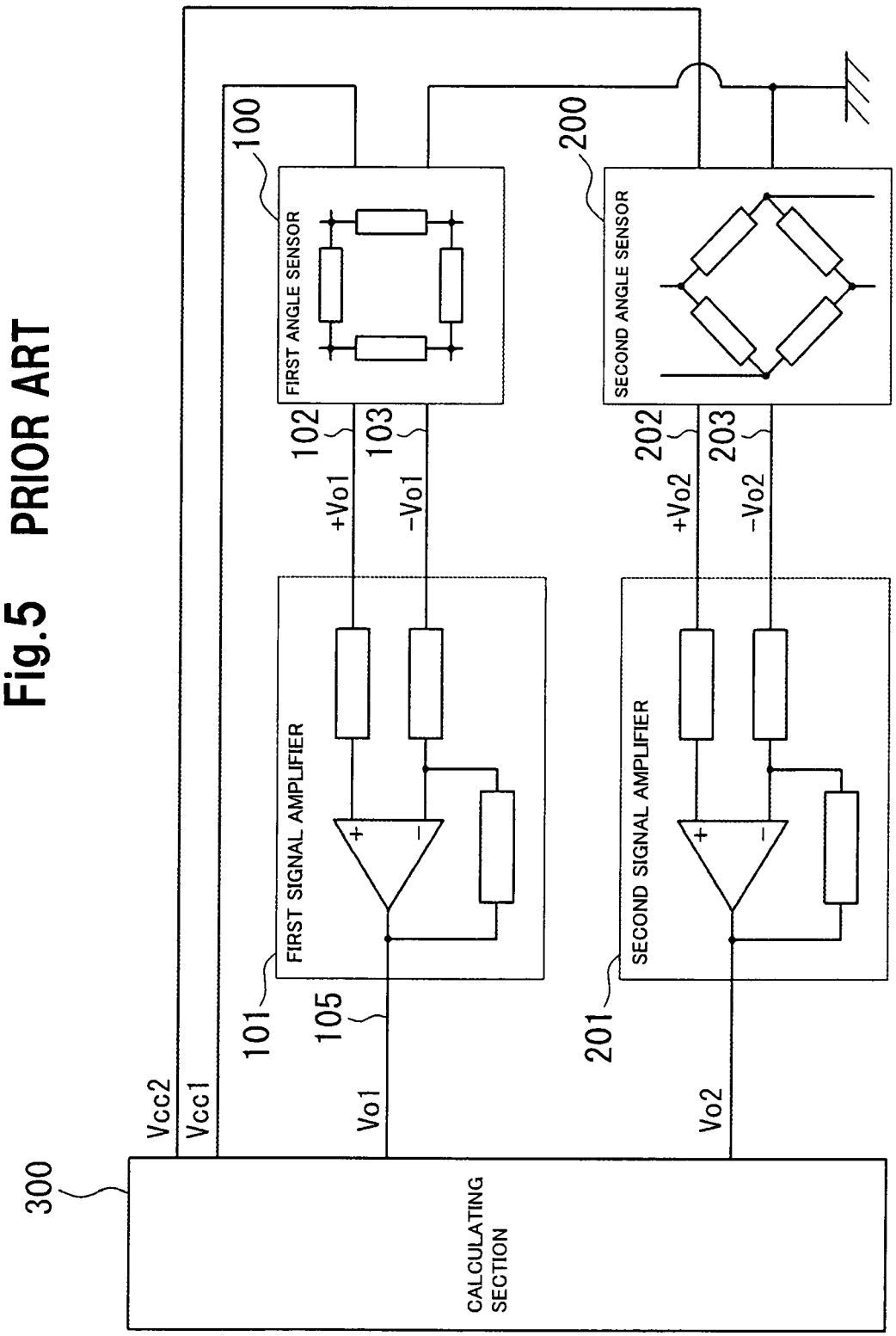
FIG. 5 is a circuit diagram showing the conventional rotational angle detecting device.
Figure 6:
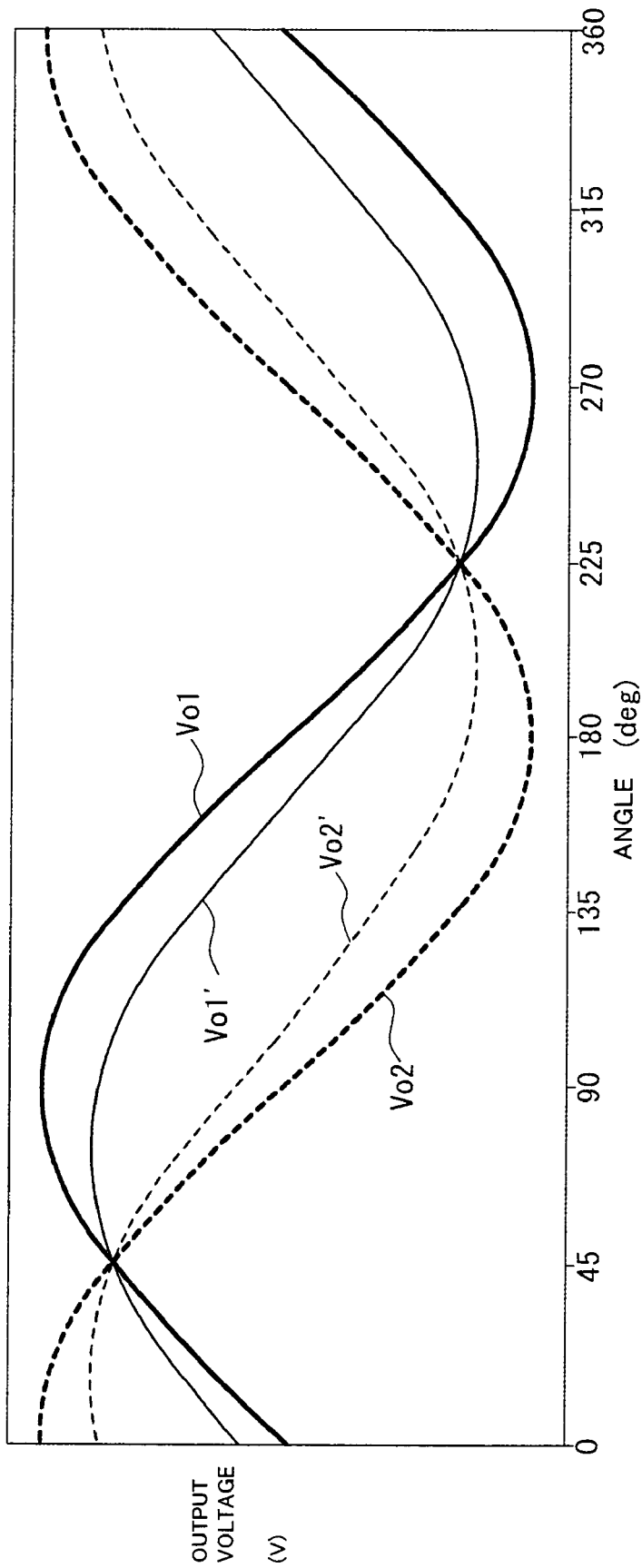
FIG. 6 is a diagram showing a change in signal.

As a result, the power source Vcc2 (5V) is supplied to the second angle sensor 4 after time t0 as shown in FIG. 3, and the signal Vo2 having a predetermined value is outputted from the second signal amplifier 5. It should be noted that a value of the signal Vo2 changes in accordance with a position of the steering shaft. More specially, the second signal amplifier 5, as shown in FIG. 4, outputs the signal Vo2 formed by amplifying the inputted signals +Vo2 and −Vo2 to a value between 1V and 4V. On the other hand, while the power source Vcc2 is supplied to the second angle sensor 4, the power source Vcc1 is not supplied to the first angle sensor 2. Therefore, the signal Vo1 outputted from the first signal amplifier 3 becomes 0 V. In a case where the power source Vcc1 is supplied to the first angle sensor 2 during next time t1 to t2, the Vo1 becomes a value between 1V and 4 V as in the case of the signal Vo2. Thus, in a case where an abnormality such as a break or a short-circuit between the wires +Vo1 and −Vo1 does not occur, the signal (reference signal) Vo1 or Vo2 of the voltage value of 1 V to 4 V is outputted from the first signal amplifier 3 or the second signal amplifier 5 of the side of which the power source is supplied and the signal Vo1 or Vo2 of the side the power source is not supplied becomes 0 V (reference signal) as a voltage value.

Back to FIG. 2, at step 201, the calculating section 6 determines whether or not abnormality such as a short-circuit occurs between the wires +Vo1 and −Vo1 based upon the inputted signals Vo1 and Vo2. More specially, the determination is made as to whether or not the voltage value of the signal Vo1 or Vo2 outputted from the signal amplifier (3, 5) connected to the angle sensor (2, 4) in the side to which the power source is supplied is between 1 V and 4 V and whether or not the voltage value of the signal Vo1 or Vo2 outputted from the signal amplifier (3, 5) connected to the angle sensor (2, 4) in the side to which the power source is not supplied is 0 V. In a case where an abnormality such as the short-circuit does not occur between the wires 2A and 2B and the power source Vcc2 is supplied to the second angle sensor 4, the signal Vo1 becomes 0 V and the signal Vo2 becomes a value of 1 V to 4 V as shown in the signal amplifier output at a normal state of the device in FIG. 3. Therefore, the calculating section 6 determines that the device is in a normal state due to no occurrence of an abnormality such as the short-circuit between the wires 2A and 2B.

Next, at step 202, the calculating section 6 determines whether or not an abnormality detecting period has elapsed from time to when the vehicular ignition switch turns on. In a case where the abnormality detecting period has not elapsed, the process goes back to step 200, wherein the calculating section 6 performs supply and interruption of a power source to the first angle sensor 2 and the second angle sensor 4 alternately and continues to execute the abnormality detecting processing of the angle sensor. In consequence, as shown in FIG. 3, the power source Vcc2 is supplied to the second angle sensor 4 from time t0 to time t1 and the power source Vcc1 is supplied to the first angle sensor 2 from time t1 to time t2.

On the other hand, as shown in FIG. 3, the time is advanced to time t3 and, at this point, it is determined at step 202 that the abnormality detecting period has elapsed, and the process goes to step 203. After time t3, at step 203, the calculating section 6 constantly supplies the power source Vcc1 and Vcc2 to the first angle sensor 2 and the second angle sensor 4 to detect an angle of the steering shaft at a normal state.

Next, the signal amplifier output in a case where the short-circuit occurs between the wires 2B and 4B is shown. First, there will be explained a case where the short-circuit occurs between the wires 2B and 4B. FIG. 3 shows, as an abnormality case 1, the signal amplifier output in a case where the short-circuit occurs between the wires 2B and 4B. The calculating section 6 supplies the power source Vcc2 to the second angle sensor 4 from time t0 to time t1. In this case, since the short-circuit occurs between the wires 2B and 4B, as shown in FIG. 3, the signal Vo2 outputted from the second signal amplifier 5 is 5 V. (should be noted that, in FIG. 3, a wave profile at a normal state is shown by a broken line) The signal Vo1 outputted from the first signal amplifier 3 is 0 V equal to that at a normal state. In consequence, the signal Vo2, as shown in FIG. 4, becomes a voltage value of 1 V to 4 V when the angle sensor is in a normal state. However, the signal Vo2 is 5 V due to the short-circuit between the wires 2B and 4B. Therefore, the calculating section 6 determines that an abnormality such as a short-circuit occurs between the wires 2B and 4B. It should be noted that FIG. 4 shows a change of the signal Vo2 within a predetermined period from time t0 to time t1. In a case where the abnormality is detected, the calculating section 6 performs a certain actions, for example, informing a passenger in a vehicle that the abnormality is occurring in the rotational angle detecting device 1.

Next, there is explained a case where the short-circuit occurs between the wires 2A and 4A. FIG. 3 shows, as an abnormality case 2, the signal amplifier output in a case where the short-circuit occurs between the wires 2A and 4A. The calculating section 6 supplies the power source Vcc2 to the second angle sensor 4 from time t0 time t1. In this case, since the short-circuit occurs between the wires 2A and 4A, as shown in FIG. 3, the signal Vo1 outputted from the first signal amplifier 3 is 5 V. The signal Vo2 outputted from the second signal amplifier 5 is 0 V. In consequence, the calculating section 6 receives the signals Vo1 and Vo2 having voltages which are different from those at a normal state. Therefore, the calculating section 6 determines that abnormality such as a short-circuit occurs between the wires 2A and 4A.

Next, there is explained a case where the short-circuit occurs between the wires 3A and 5A. FIG. 3 shows, as an abnormality case 3, the signal amplifier output in a case where the short-circuit occurs between the wires 3A and 5A. The calculating section 6 supplies the power source Vcc2 to the second angle sensor 4 from time t0 to time t1. In this case, since the short-circuit occurs between the wires 3A and 5A, as shown in FIG. 3, the signal Vo1 outputted from the first signal amplifier 3 and the signal Vo2 outputted from the second signal amplifier 5 are outputted as the same value. In consequence, the calculating section 6 receives the signals Vo1 and Vo2 having voltages which are different from those at a normal state. Therefore, the calculating section 6 determines that abnormality such as short-circuit occurs between the wires 3A and 5A.

In addition, in a case where the short-circuit occurs between the wires 2A and 2B during detection processing at a normal state after the abnormality detecting period has elapsed, since a rotational angle of the steering shaft calculated by the calculating section 6 abruptly and largely changes, the calculating section 6 can detect the abnormality such as short-circuit.

It should be noted that in the embodiment, the first angle sensor 2 constitutes a first detecting section in the present invention and the second angle sensor 4 constitutes a second detecting section in the present invention. In addition, step 203 constitutes an angle detecting unit in the present invention and step 201 constitutes an abnormality detecting unit in the present invention. Step 200 constitutes a power supplying unit in the present invention. Further, the output system of the detecting section in the present invention includes from angle detecting elements in the first angle sensor 2 and the second angle sensor 4 to the output terminals of the first angle sensor 2 and the second angle sensor 4, and from the output terminals of the first angle sensor 2 and the second angle sensor 4 to the wires 2A, 2B, 3A, 4A, 4B and 5A for connecting between the output terminals and the calculating section 6.

The embodiment is constructed as described above. That is, after the vehicular ignition switch turns on, supply and interruption of a power source to the first angle sensor 2 and the second angle sensor 4 are alternately performed, by comparing the signal Vo1 or Vo2 which is outputted from the first angle sensor 2 or the second angle sensor 4 and amplified by the first signal amplifier 3 or the second signal amplifier 5 with the signal Vo1 or the signal Vo2 in a state where the abnormality such as the short-circuit does not occur between the wires, the determination is made as to whether or not the abnormality such as the short-circuit is present between the wires. The calculating section 6 can quickly detect an abnormality such as the short-circuit simply by supplying the power source to the first angle sensor 2 or the second angle sensor 4. In consequence, the abnormality of the rotational angle detecting device 1 can be detected before the steering wheel connected to the vehicular steering shaft is operated. In addition, even in a case where a characteristic variation of the element in the first angle sensor 2 or the second angle sensor 4 exists, and for example, an amplitude of the signal Vo1 or Vo2 is small, abnormality such as short-circuit between the wires can be accurately detected.

It should be noted that the calculating section 6 detects an abnormality such as the short-circuit in a case where the short-circuit occurs between the wires 2B and 4B (abnormality case 1), in a case where the short-circuit occurs between the wires 2A and 4A (abnormality case 2) and in a case where the short-circuit occurs between the wires 3A and 5A (abnormality case 3). Other than the above, for example even in a case where the short-circuit occurs between the wires 2A and 2B, in a case where the short-circuit occurs between the wires 4A and 4B, in a case where the short-circuit occurs between the wires 2B and 4A and in a case where the short-circuit occurs between the wires 2A and 4B, since the voltage value of each of the signals Vo1 and Vo2 outputted from the first signal amplifier 3 and the second signal amplifier 5 are different from those at a normal state, the calculating section 6 can detect an abnormality such as the short-circuit between the wires. In addition, the calculating section 6 can detect an abnormality such as the short-circuit occurring in wires from the angle detecting elements in the first angle sensor 2 and the second angle sensor 4 to the output terminals in the first angle sensor 2 and the second angle sensor 4. Further, in the embodiment the explanation is made as to the abnormality detecting procedure in a case where the short-circuit occurs between the wires. However, even in a case where the wire is broken, since the voltage value of each of the signals Vo1 and Vo2 outputted from the first signal amplifier 3 and the second signal amplifier 5 are different from those at a normal state, the calculating section 6 can detect abnormality of the wire.

While only a selected preferred embodiment has been chosen to illustrate the present invention, it will be apparent to those skilled in the art from this disclosure that various changes and modifications can be made herein without departing from the scope of the invention as defined in the appended claims. Furthermore, the foregoing description of the preferred embodiment according to the present invention is provided for illustration only, and not for the purpose of limiting the invention as defined by the appended claims and their equivalents.

The invention claimed is:

1. A rotational angle detecting device comprising:
   a detecting section for outputting a signal in accordance with a rotational angle of a rotary element;
   an angle detecting means for detecting a rotational angle of the rotary element based upon the signal outputted from the detecting section;
   an abnormality detecting means for detecting abnormality of an output system of the detecting section based upon the signal outputted from the detecting section; and
   a power supplying means for supplying power to the detecting section, wherein:
   a power supplying means performs supply and interruption of the power to the detecting section; and
   the abnormality detecting means compares a reference signal outputted from the detecting section when the power supplying means performs supply and interruption of the power in a case where no abnormality occurs in the output system of the detecting section with a signal outputted from detecting section when the power supplying means performs supply and interruption of the power, thereby detecting abnormality of the output system of the detecting section,
   wherein:
   the rotary element includes a steering shaft for a vehicle; and
   the power supplying means performs supply and interruption of the power to the detecting section by a predetermined time after a vehicular ignition switch turns on whereby the abnormality detecting means detects abnormality of the output system of the detecting section.

2. A rotational angle detecting device according to claim 1, wherein said abnormality detecting means performs its function of detecting abnormality of the output system of the detecting section without need for rotation of the rotary element.

3. A rotational angle detecting device according to claim 2 wherein said abnormality detecting means performs its function of detecting during an abnormality detecting period after an ignition switch is turned on.

4. A rotational angle detecting device according to claim 1 wherein said abnormality detecting means performs its function of detecting abnormality of the output system of the detecting section without need for rotation of the steering shaft of the vehicle.

5. A rotational angle detecting device comprising:
   a detecting section for outputting a signal in accordance with a rotational angle of a rotary element;
   an angle detecting means for detecting a rotational angle of the rotary element based upon the signal outputted from the detecting section;
   an abnormality detecting means for detecting abnormality of an output system of the detecting section based upon the signal outputted from the detecting section; and
   a power supplying means for supplying power to the detecting section, wherein:
   a power supplying means performs supply and interruption of the power to the detecting section;
   the abnormality detecting means compares a reference signal outputted from the detecting section when the power supplying means performs supply and interruption of the power in a case where no abnormality occurs in the output system of the detecting section with a signal outputted from detecting section when the power supplying means performs supply and interruption of the power, thereby detecting abnormality of the output system of the detecting section;
   the detecting section includes a first detecting section and a second detecting section; and
   the power supplying means supplies a power source separately to the first detecting section and the second detecting section,
   wherein:
   the rotary element includes a steering shaft for a vehicle; and
   the power supplying means performs supply and interruption of the power to the detecting section by a predetermined time after a vehicular ignition switch turns on whereby the abnormality detecting means detects abnormality of the output system of the detecting section.

6. A rotational angle detecting device according to claim 5 wherein said abnormality detecting means performs its function of detecting abnormality of the output system of the detecting section without need for rotation of the steering shaft of the vehicle.

7. A rotational angle detecting device comprising:
   a detecting section for outputting a signal in accordance with a rotational angle of a rotary element;
   an angle detecting means for detecting a rotational angle of the rotary element based upon the signal outputted from the detecting section;
   an abnormality detecting means for detecting abnormality of an output system of the detecting section based upon the signal outputted from the detecting section; and
   a power supplying means for supplying power to the detecting section,
   wherein:
   a power supplying means performs supply and interruption of the power to the detecting section; and the abnormality detecting means compares a reference signal outputted from the detecting section when the power supplying means performs supply and interruption of the power in a case where no abnormality occurs in the output system of the detecting section with a signal outputted from detecting section when the power supplying means performs supply and interruption of the power, thereby detecting abnormality of the output system of the detecting section, and, wherein:

the rotary element includes a steering shaft for a vehicle;

the power supplying means performs supply and interruption of the power to the detecting section by a predetermined time after a vehicular ignition switch turns on whereby the abnormality detecting means detects abnormality of the output system of the detecting section; and said abnormality detecting means performs its function of detecting abnormality of the output system of the detecting section without need for rotation of the rotary element.

* * * * *